March 25, 1947.   E. J. MARASKO   2,418,082
CHUCKING FIXTURE
Filed Oct. 4, 1944

INVENTOR.
EDWARD J. MARASKO
BY
ATTORNEYS

Patented Mar. 25, 1947

2,418,082

UNITED STATES PATENT OFFICE 2,418,082

CHUCKING FIXTURE

Edward James Marasko, Cleveland, Ohio, assignor to The Weatherhead Company, Cleveland, Ohio, a corporation of Ohio Application October 4, 1944, Serial No. 557,131

8 Claims. (Cl. 279—4)

This invention relates to work holding fixtures and more particularly to fixtures of the automatic collet chuck type.

It is among the objects of my invention to provide a fluid or pneumatically operated collet chuck or fixture that is simple and compact in structure, free of external moving parts, connections and the like, efficient in its operation, free from impairment of operation by intrusion of rust, grit, chips and dirt, economical of manufacture, facile of adjustment and repair and inherently foolproof, sturdy and long wearing.

Other objects include the provision of a chuck that can be readily transported from place to place and quickly set up. Another object is to provide a ready means of changing collets from one size or shape to another and for readily adjusting the chucks and collets to different lengths and shapes of work to be fixed and secured therein.

Figure 1:
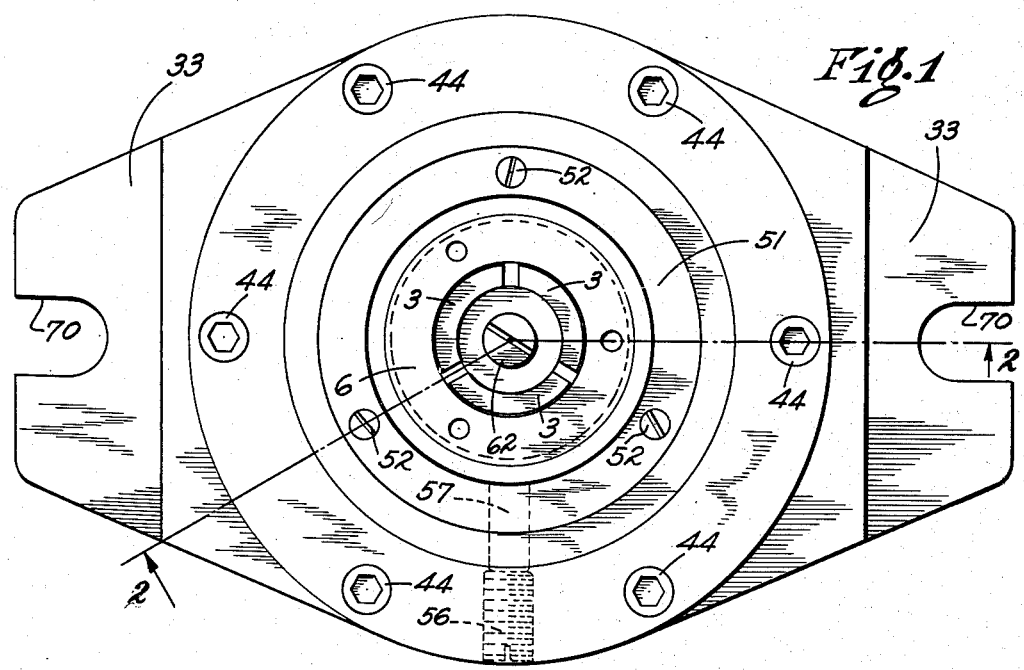
Figure 2:
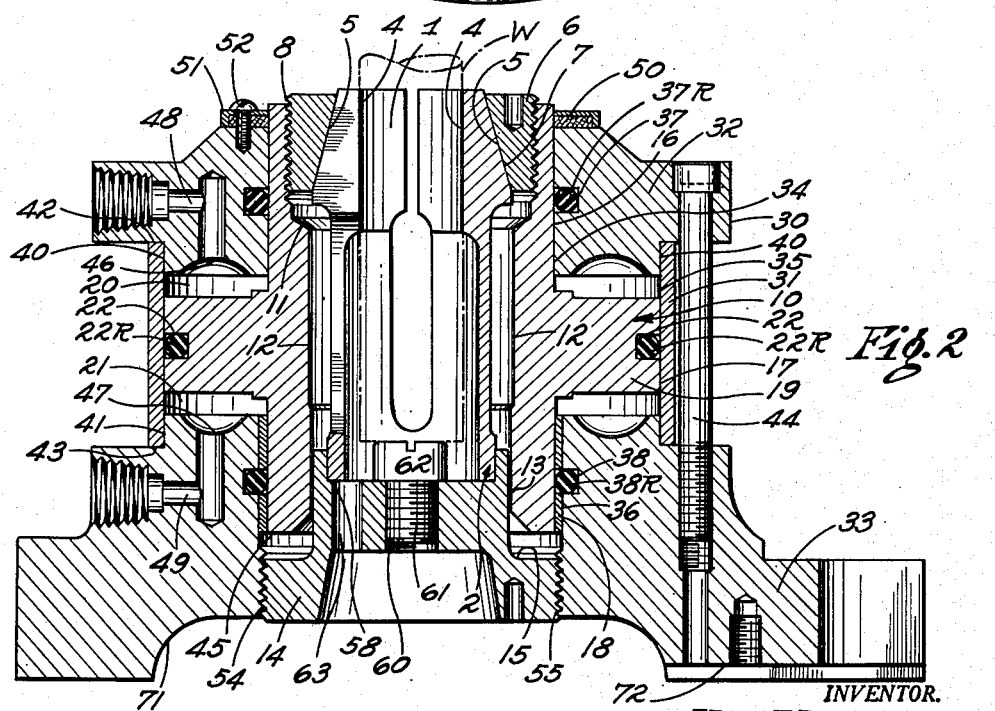

Other objects and advantages will appear from the following description of a preferred form and embodiment of my invention, reference being had to the accompanying drawings in which Figure 1 is a top plan view of an illustrative fixture embodying my invention, and Figure 2 is a longitudinal section along the broken line 2—2 of Figure 1.

In the preferred form of my invention herein illustrated the work holding collet 1 stands within and coaxial of a hollow piston 10, which piston is slideably supported for longitudinal motion in a multi-piece cylinder assembly 30. The collet is preferably of the spring finger type having an annular bottom end or neck 2 from which integral spaced fingers 3 (three in number as shown) rise as viewed in Figure 2, and terminate in internal work gripping pads and surfaces 4 and external substantially conical cam surfaces 5. A cam ring 6 having an inner conical surface 7 coacting with the finger cam surfaces 5, is carried internally of the upper end of the piston 10 as by threaded engagement therewith at 8. Downward movement of the piston 10 and cam ring 6 relative to the collet 1 urges the ends of the fingers 3 radially inward to grip the work W, shown in dotted lines, and hold the same securely for such operations as may be desired to be performed thereon. Upward movement of the piston relative to the collet releases the work. It will be noted that there is no relative longitudinal motion between the work W and the collet 1 or pads 4 thereof during the gripping or releasing of the work.

The hollow piston 10 is counterbored below the threads 8 to afford ample clearance from the cams 5 as at 11 and is bored out for the remainder of its length to clear the fingers of the collet as at 12 and to have a free clearance as at 13 from the adjacent cylindrical surface of the bottom plug 14, upon which the bottom ring 2 of the collet is supported. The bottom end of the piston 10 terminates in spaced relation to the shoulder 15 and moves freely relative thereto in its upward and downward travel.

Externally the piston has three coaxial smooth cylindrical surfaces 16, 17 and 18 of which the uppermost and lowermost surfaces 16 and 18 may be substantially equal in length and diameter, and the middle surface 17 is of substantially greater diameter, defining as it does the periphery of the enlarged middle annular flange like part 19 of the piston. As will more fully appear below the flange 19 of the piston lies between an upper annular fluid pressure space or chamber 20 and a lower annular fluid pressure chamber 21, the pressure differences between which actuate the piston 10. The longitudinal thickness of the flange part 19 may be proportioned about as shown in Figure 2, having in mind that I provide an annular packing groove 22 in about the middle height thereof at the mid-height of the cylindrical surface 17, and prefer that the groove be not wider than the smooth adjacent parts of the surface 17. Preferably at least the surfaces 16, 17 and 18 are chrome plated to be rust resistant since condensate from pneumatic actuation is a thing against which I find it well to take this precaution especially when using machine steel for the body of the piston as is often practicable and desirable.

The cylinder assembly 30 comprises the ring 31, the head 32 and the base 33, each part having an inner cylindrical surface coaxial with and juxtaposed to the external cylindrical surfaces of the piston 10 and having a close and free sliding engagement therewith. Thus the head 32 has an inner cylindrical surface 34 coacting with the piston surface 16; the ring 31 has an inner cylindrical surface 35 coacting with the piston surface 17, and the base 33 has an inner cylindrical surface 36 coacting with the piston surface 18. As shown in Figure 2 I provide annular packing grooves 37 and 38 in about the mid-height of the surfaces 34 and 36, juxtaposed to the respective piston surfaces.

Both the head and base have external cylindrical coaxial surfaces 40 and 41 respectively of like diameter extending respectively downwardly and upwardly from true annular radially planar surfaces 42 and 43 respectively. The ring 31 is right cylindrical, and as shown in Figure 2 has end bearing contact with the head and base respectively on the surfaces 42 and 43 and has preferably a snug, though not pressed, fit adjacent its ends with the cylindrical surfaces 40 and 41. Thus when the parts are assembled as shown in Figure 2 and the head and base are drawn forcibly toward each other as by the several cap screws 44 all the parts of the cylinder assembly 30 are secured in true alignment with their cylindrical surfaces truly coaxial and in proper desired alignment with the respective coacting piston surfaces. If desired annular sealing gaskets may be interposed between ends of the ring 31 and the surfaces 42 and 43, but I prefer to form the ring 31 of brass or similar material which under the clamping pressures of the screws 44 will be satisfactorily self-sealing in contact with the surfaces 42 and 43. I prefer that the head 32 be made of brass and while the base 33 may be made of the same material, I prefer to make it of cast iron or meehanite for reasons of strength and economy. In the later instance and to make the device rust-proof I find it preferable and practicable to puddle in a brass liner 45 and thereafter machine the cylindrical surface 36 directly on the liner 45 and machine the packing groove 38 through the liner as well as the adjacent wall of the base after the liner has been cast or puddled in. The head and base members are each formed with an annular groove 46 and 47 respectively defining in part the upper and lower walls respectively of the pressure chambers 20 and 21. Passageways and pipe connections 48 and 49 are provided in the head and base members respectively to facilitate the admission and withdrawal of fluid to and from the chambers 20 and 21 to admit and exhaust the piston actuating pressures under appropriate control and from appropriate sources of pressure not shown.

To seal the actuating fluid and pressure from escape between the respective piston and cylinder walls I provide in each of the packing grooves 22, 37 and 38 appropriate annular packing or piston rings 22R, 37R and 38R suitable for this purpose. For ease of illustration I have merely shown well-known rubber or rubber-like "O" rings in the packing grooves, but my preference, as presently advised, is to employ the sealing rings of the type described in the Jackman Patent No. 2,349,170. When the chuck or fixture is to be pneumatically operated those skilled in the art will appreciate the desirability of providing suitable lubricant for the packing rings. To that end I prefer to employ grease selected with relation to the rubber-like material of the rings to be preservative rather than destructive thereof. An upper wiping ring such as a felt washer 50 is preferably carried on the upper surface of the head 32 and secured in place by an appropriate clamp ring 51 with screws 52 so that the ring 50 will have wiping contact with the upper cylindrical surface 16 of the piston and perform the dual duty of excluding undesirable foreign material on the one hand and retaining lubricant on the other hand.

As shown in Figure 2 the base member 33 is centrally tapped with female threads 54 to receive the male threads 55 of the plug member 14 through which the plug is adjustably secured within the base member and can be raised more or less to selected longitudinal positions therein. Preferably a set screw 56, see Fig. 1, with a brass pin or shoe 57 enters the base member transversely at about the level of the threads 54 therein so that the set screw 56 may force the shoe 57 into forcible contact with the threads 55 of the plug 14 whereby to hold it against rotation in any desired position of longitudinal adjustment within the base 33.

As mentioned above the plug 14 is dimensioned to clear the interior wall of piston 10 freely as at 13. The plug 14 is preferably bored out on its top side at 58 to receive, center and support the bottom end and ring part 2 of the collet. By the screw threaded adjustment of the plug 14 in the threads 54 the collet may be raised or lowered more or less in relation to the cylinder assembly and compensation may be had as between collets of different length. Complementary adjustment of the cam ring 6 in its threaded engagement 8 with the upper end of the piston 10 will permit the upper end of the collet to be exposed more or less as desired having regard for the adjusted position of the plug 14.

The plug 14 is preferably centrally drilled and tapped as at 60 whereby to receive large headed threaded gauge plugs such as the plug 61 with which to support the work W in desirably selected relation to the gripping pads of the collet. In practice a plurality of different plugs 61 having heads 62 of different heights can be selectively chosen to position the bottom end of the work in relation to the gripping pads of the collet as may be desired.

Preferably the plug 14 may also have one or more longitudinal holes 63 through which chips and dirt may fall or be blown or removed. When the fixture is to be secured for a substantial period of time as on the table of a drill press by clamping studs or other means, not shown, acting through the end slots 70 of the base 33, I find it preferable to form the bottom of the base more or less arch-like as at 71 to further facilitate the cleaning of extraneous material from under the bottom side thereof. Key slots 72 facilitate positive location of the device.

In operation pressure in the chamber 21 in excess of that in the chamber 20 lifts the piston 10, moving the cam surface 6 upwardly and away from or along the cam surfaces 5 of the collet, permitting the pads of the collet to expand radially to a work receiving or releasing position. In that condition the work W may be withdrawn and new work inserted with its bottom resting on the plug 61 in the desired position for the operation to be performed. Thereupon increasing the pressure in the chamber 20 while preferably relieving the pressure in the chamber 21 moves the piston and cam ring 6 downwardly gripping and centering the collet and the work and urging the collet downwardly into firm engagement at its bottom with the surface 58 of the plug 14. The plug 14 being held against rotation, the downward force of the piston holds the collet in firm engagement with the plug 14 and thereby holds the work against rotation as well as holding it accurately centered and secure against any other movement; the ring 6 being centered within and radially juxtaposed to the guiding surfaces 16 and 34 at the upper end of the piston and alignment of all the parts being induced by the other coaxial surfaces of the collet, piston and cylinder assembly. It will be understood that the angle of the cam surfaces 5 and 7 will be selected with regard to the hardness thereof and the material of which they are formed whereby to be above the critical angle at which the surfaces might tend to bind to impair release of the work after the desired operations have been performed thereupon.

While I have illustrated and described a preferred form and embodiment of my invention, modifications, changes and improvements will occur to those skilled in the art who come to understand or practice the precepts thereof, and I do not care to be limited in the scope of my patent or the preferred form and embodiment of my invention or in any manner other than by the claims appended hereto.

I claim:

1. In a fluid actuated chuck a body member forming a cylinder with bores of two diameters, a collet, a hollow piston encompassing the collet having outer parts of two diameters, said cylinder surrounding the piston and guiding the parts of one diameter and forming fluid pressure chambers on opposite sides of the other diameter part of the piston, the collet being supported by the body member at one end and having gripping pads and angular adjacent cam surfaces adjacent the other end thereof, and a cam portion on said piston coacting with the cam surfaces of the collet.

2. A chuck comprising in combination a hollow piston having cylindrical end portions and an intermediate cylindrical flange portion, a cylinder assembly encompassing and slidably supporting said piston, parts of said cylinder and the flange portion of the piston defining actuating fluid pressure chambers, other parts of said cylinder forming guiding surfaces for said piston, an adjustable support member carried by said cylinder assembly and entering one end of said hollow piston, a collet supported at one end by said member and having gripping pads and cam surfaces on its opposite end, and a cam ring adjustably carried by said piston adjacent the cam surfaces of said collet.

3. A chuck comprising in combination a hollow piston having an enlarged flange portion, a cylinder assembly encompassing and slideably supporting said piston, parts of said cylinder assembly defining with said flange portion piston actuating fluid pressure chambers, other parts of said piston forming guiding surfaces for said piston, a support member carrier by one end of said cylinder assembly and entering one end of said hollow piston, a collet supported by said support member, and collet actuating means carried by said piston remote from said member.

4. A chuck comprising in combination a hollow piston having a continuous bore from end to end, a cylinder assembly encompassing and slideably supporting said piston, an adjustable support member carried by one end of said cylinder assembly opposite one end of said piston, a collet disposed within the bore of said piston and supported by said member and having gripping pads and cam surfaces on its opposite end adjacent the other end of said piston, a cam adjustably carried by said piston adjacent the cam surfaces of said collet, whereby various sizes of collets may be accommodated.

5. In a fluid actuated chuck a hollow piston, a collet disposed within said piston with its gripping pads adjacent one end of the piston, means holding the collet longitudinally immovable within said piston, the piston having external cylindrical surfaces of different diameters, a cylinder assembly having cylindrical surfaces corresponding to the said piston surfaces of different diameters, one pair of corresponding piston and cylindrical surfaces being disposed adjacent to the gripping pads of said collet, parts of said piston and cylinder assembly spaced between the said cylindrical surfaces of greater and lesser diameter defining pressure chambers for actuating fluid to move said piston relative to said cylindrical assembly, each pair of said corresponding cylindrical surfaces having a packing groove in one of the surfaces of the pair, and packing rings in each packing groove.

6. In a fluid actuated chuck a hollow piston, a collet disposed within said piston and held against longitudinal movement therein, the piston having external cylindrical surfaces of different diameters, a cylinder having mating cylindrical surfaces corresponding to the piston surfaces of said different diameters, parts of said piston and cylinder assembly spaced between the said cylindrical surfaces of greater and lesser diameter defining pressure chambers for receiving actuating fluid to move said piston relative to said cylindrical assembly, each pair of said mating cylindrical surfaces having a packing groove in one of the surfaces of the pair, packing rings in each packing groove, and means carried by said cylinder assembly for supporting said collet within said piston, said means being apertured to facilitate the egress of chips therethrough.

7. A chuck, comprising in combination a hollow piston having cylindrical end portions and an intermediate cylindrical flange portion, a cylinder assembly encompassing and slideably supporting said piston, parts of said cylinder and the flange portion of the piston defining fluid pressure actuating chambers, other parts of said cylinder forming the guiding surfaces for said piston, an adjustable support member carried by said cylinder assembly and entering one end of said hollow piston, a collet supported at one end by said support member and having gripping pads and cam surfaces adjacent its other end, and a cam ring adjustably carried by said piston adjacent the cam surfaces of said collet.

8. A chuck, comprising in combination a hollow piston having cylindrical end portions and an intermediate cylindrical flange portion, a cylinder assembly encompassing and slideably supporting said piston, parts of said cylinder and the flange portion of the piston defining fluid pressure actuating chambers, other parts of said cylinder forming the guiding surfaces for said piston, an adjustable support member carried by said cylinder assembly and entering one end of said hollow piston, a collet supported at one end by said support member and having gripping pads and cam surfaces adjacent its other end, and a cam ring adjustably carried by said piston adjacent the cam surfaces of said collet, said support member being apertured to facilitate the egress of chips therethrough.

EDWARD JAMES MARASKO.

REFERENCES CITED

The following references are of record in the file of this patent:

UNITED STATES PATENTS

| Number | Name | Date |
| --- | --- | --- |
| 2,335,721 | Zagar | Nov. 30, 1943 |
| 2,338,060 | Redmer | Dec. 28, 1943 |
| 1,236,453 | Lavoie | Aug. 14, 1917 |